United States Patent [19]

Garcia

[11] Patent Number: 5,060,413
[45] Date of Patent: Oct. 29, 1991

[54] FISHING LINE LAUNCHING DEVICE

[76] Inventor: Manuel E. Garcia, Manuel Obarrio 2080, Olivos, Buenos Aires, Argentina

[21] Appl. No.: 271,179

[22] Filed: Nov. 14, 1988

[30] Foreign Application Priority Data

Nov. 17, 1987 [AR] Argentina ............................... 309.319
Jul. 28, 1988 [AR] Argentina ............................... 311.539

[51] Int. Cl.⁵ ............................................. A01K 91/02
[52] U.S. Cl. ............................................................. 43/19
[58] Field of Search ................................. 43/19; 89/1.34

[56] References Cited

U.S. PATENT DOCUMENTS

| | | | |
|---|---|---|---|
| 2,958,975 | 11/1960 | Neff et al. | 43/19 |
| 3,656,252 | 4/1972 | Sherman | 43/19 |
| 3,717,947 | 2/1973 | Nomura | 43/19 |
| 3,834,056 | 9/1974 | Filippi | 43/19 |
| 4,631,852 | 12/1986 | Whritenour | 43/19 |
| 4,741,243 | 5/1988 | Snider | 89/1.34 |
| 4,776,255 | 10/1988 | Smith | 89/1.34 |
| 4,799,906 | 1/1989 | Perkins Jr. | 89/1.34 |

FOREIGN PATENT DOCUMENTS 952900 11/1949 France .
2114477 6/1972 France .
2228425 12/1974 France .

Primary Examiner—Richard K. Seidel
Assistant Examiner—Carmine Cuda
Attorney, Agent, or Firm—Darby & Darby

[57] ABSTRACT

An apparatus for launching a fishing line, that can be fixed to the ground and the fishing rod or held to the body by straps that has in its front end an explosion chamber in which a cartridge is acommodated against the stem of a fishing line sinker which has been inserted through a hole in the end of the apparatus, and a percussion pin which is slidable through a sleeve to impact the primer of the cartridge by means of a percussion device comprising at least one spiral spring that when released by means of a firing mechanism activates the percussion device to drive the percussion pin against the primer of the cartridge.

14 Claims, 3 Drawing Sheets

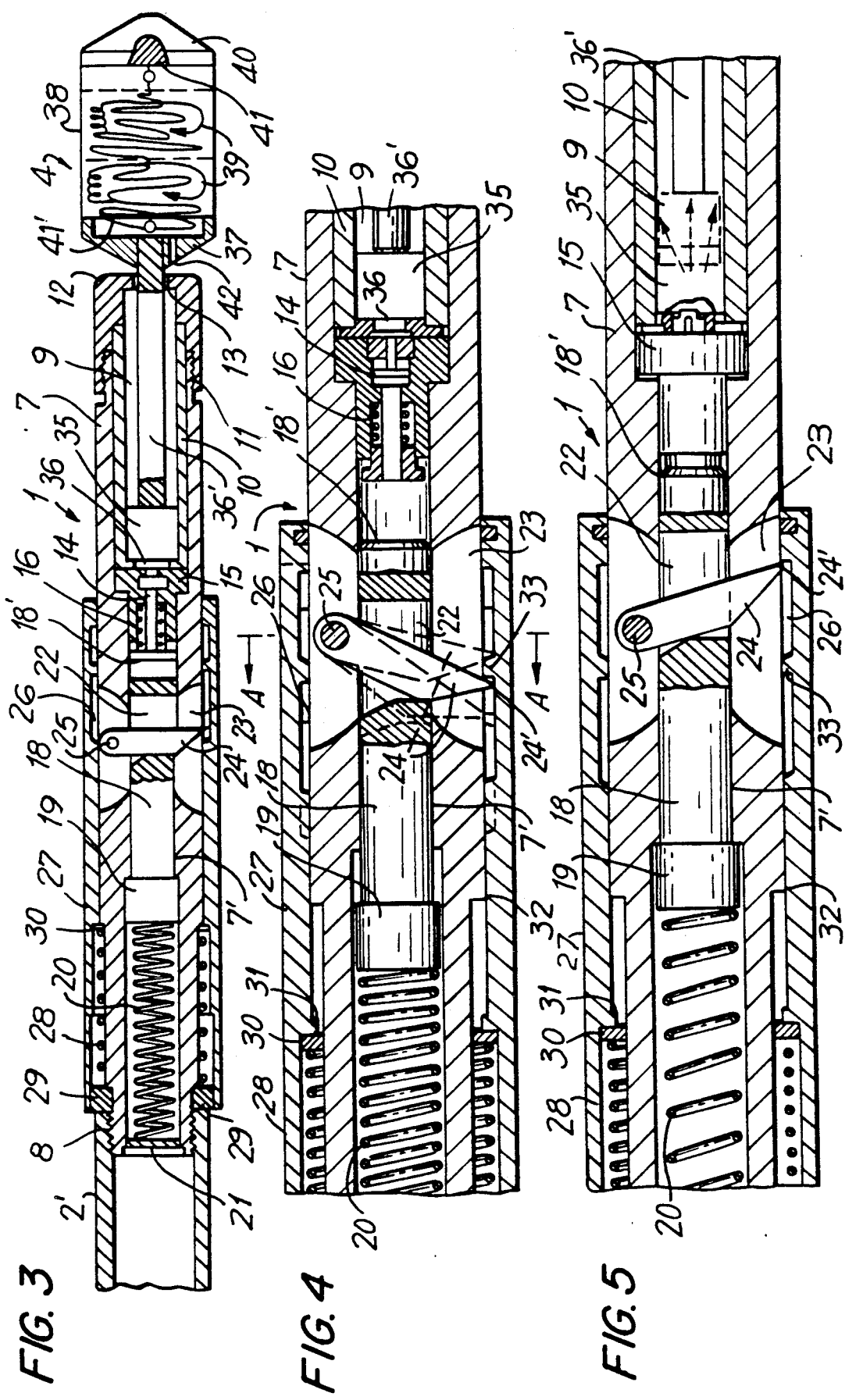

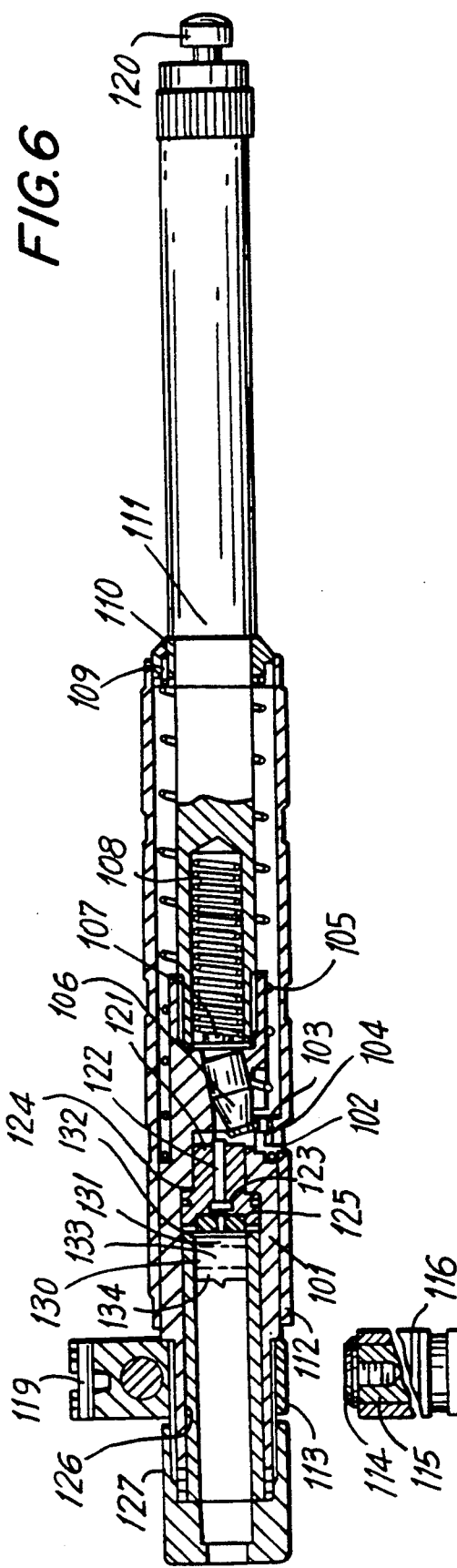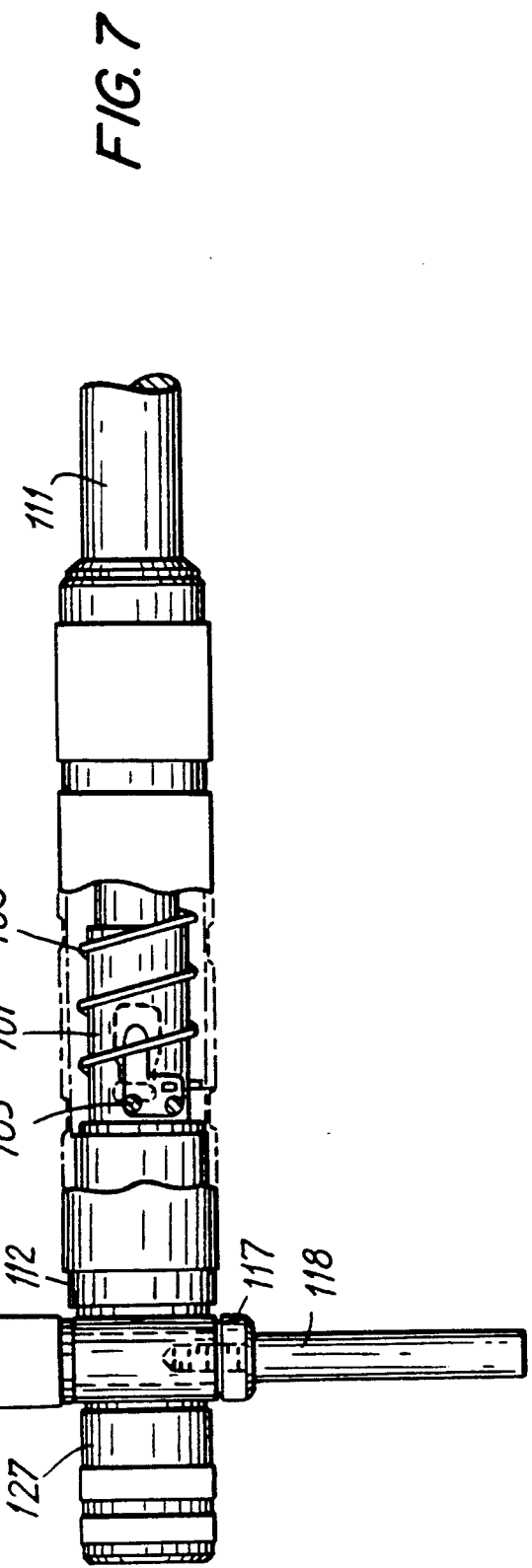

FISHING LINE LAUNCHING DEVICE

The present invention relates to an apparatus for launching a line applicable to a fishing rod and particularly to an apparatus for throwing a fishing line, provided with fishhooks and baits, at greater distances than those achieved with conventional launchings.

It is generally known that for casting fishing lines, rods of adequate length and flexibility are required. With corresponding reels to place bait at adequate distances.

The launching of the line by casting depends exclusively on the manner of execution, depending on a sportsman's skill and physical power or his dexterity. The purpose being of course to reach the greatest possible distance and the exact placement of the line in order to increase the probabilities of success, particularly when the launching is made from a beach, towards deep waters.

These results are not always obtained, because some inexperienced or elderly fishermen, cannot attain a correct launching, either not establishing proper distance or convenient depth for the intended type of fishing.

To avoid these drawbacks in launchings and for all sportsmen to have equal chances, the present invention proposes a propelling apparatus for the fishing line to give all sportsmen an equal opportunity independent of their skill or physical power.

Another limitation of launching by casting, is that ample, relatively convenient space is necessary for the movements required by a fisherman when effecting a launch. It is not always obtainable to find such space when fishing in breakwaters or piers or from small boats with profuse rigging of masts and spare.

The device of the present invention may also be applied to fishing with the line only. In this case, the launching is effected by the classic flinging of the end of the line, and taking the advantage of the weight of the sinker. However, this has a limited launching distance and has the danger derived from a flying sinker and fishhooks during casting.

Furthermore, the movement which is made during the act of launching the line by casting, is very dangerous in that sinker and fishhook describes a launch path from the rear of the fisherman's location and that when launched, may hit or hook any objects or persons in the surroundings, within the launch path.

Proof of the foregoing is the unusual fact that, in the fishing areas in the telephone directories in some countries, some ophthalmologists' announcements appear among advertisements of fishing articles and boat fishing tours.

This is due to a large number of accidents which are caused by flying fishing lines being launched and as a consequence of hooking in parts of the launcher's body or of any surrounding persons, and of hits made by the sinkers.

In using the device of the invention as an ejector or launcher of fishing lines it has to be considered that: in projecting a sinker that drags a fishing line to distances greater than those reached by any average fisherman, whatever may be the skill used, even with the technological improvement in his equipment, a force is needed which often is the product of the energy developed within the device by the combustion of gunpowder lodged in a cartridge of such a design that, in spite of the explosion produced, the shooting should be absolutely silent.

Due to the power created through this device, another application of the device is the launching of ropes to allow a ship to be boarded. Such advantages being that it surpasses any known rope launcher in efficiency and distance, the absence of noises and a lower recoil force.

Also the device may be supported and rest on a person by means of a strap, either of plastic material, or leather, etc. which thereby avoids the uncomfortable and violent recoil forces.

Preferably there is a safety system, such that when loaded, should it be hit or fall violently, the safety system will prevent its shooting off or spontaneously exploding.

The device of the present invention consists basically of a booster which is complementary to a fishing rod and reel.

A preferred embodiment of the invention consists basically of a fishing line holder which is secured to the end of the casting line, a driver device and support to secure said devices on the rod.

The line holder is constituted by a pocket, generally cylindrical of a certain weight, in order that it constitute or accomplish the function of a sinker and with the object of facilitating line flow.

Said line holder defines an accommodation chamber of the fishing tackle with the fishhooks and the bait, the extremes of which are secured to the bottom of the pocket and a closing cover. The closing cover is capable of separating when it impacts on the water, thus setting the line free to immerse in the water.

The bottom of the pocket has a stem, preferably made of steel, through which an impulsing force generated by the impulsing device is transmitted and in such a manner that the line holder will acquire an initial speed sufficient to cover the desired distance.

The cover of the pocket consists of a metal disk provided with a peg to secure one of the extremes of the line; the opposite extreme of the line remaining secured to another peg located at the bottom of the pocket, and which has a hole for the passing of the casting line fastner loop.

Before launching, said line is duly folded inside the pocket in such a manner that at the moment of impact against the water surface, the cover is easily separated and drags the line from inside the pocket, said line extending until the tackle lines and the fishhooks are set free.

The impelling device, in turn, consists of a tubular body provided at one extreme with a means for fixing to a support generally formed by a threaded portion. The tubular body has, at the other extreme, a chamber like cylindrical jacket extractable or removable when an explosive cartridge is lodged therein. The tubular body is specially designed with the chamber being retained by a cover having a hole for introducing the line holder stem which, in an operative position is supported on said cartridge.

The acoustic level, produced in the moment of the shot, is similar to the snap produced by a compressed air rifle.

In order to facilitate maintenance tasks and loading, the jacket is easily extractable from its lodging and for these operations it is only required to take off the threaded cover which is retained in the tubular body.

The cartridge is composed, basically, of two main parts: a rear part, built of a special plastic, wherein a percussion cap similar to that of hunting cartridges is lodged; and a forward part, of the same material, in the shape of a suction cup.

Both parts are assembled under pressure, and the cavity formed by these parts houses a small ration of gun powder. Furthermore, the cartridge is reinforced on its forward portion with a metallic plate inserted in the outer portion of the suction cup, in order to support the thrust thereof on the sinker tail.

The cartridge, once accommodated inside the cylinder, which is in turn, housed inside the tubular body, remains in intimate contact with the percussion block, in such a manner that, when the shooting mechanism is actuated, a needle hits the percussion cap, producing the detonation.

In an embodiment, the projectile comprises the sinker of the fishing line. This sinker has been previously introduced in the mouth, of the apparatus until its tail abuts on the metallic area of the cartridge.

When the gun powder combustion is started, the pressure generated in the chamber forces the plastic parts of the cartridge to separate, and the suction cup thereof slides at high speed pushing the sinker tail until it is projected outside.

The suction cup hits, the inside of the threaded cap, since this has an outlet hole or a smaller diameter than that of the suction cap. The suction cup on the cover seals the combustion chamber to prevent violent releasing of gases. In this manner, the acoustic level produced is comparable to the snap made by a compressed air rifle.

The abovementioned percussion block, comprises a cylindrical body on the inside of which a percussion needle slides. The mass that strikes this needle consists of a cone-cylindrical part running in the inside of a hole made in the tubular body, obliquely with respect to its longitudinal axis. Against such mass, a spring permanently exerts a duly gauged force.

In an embodiment, inside the tubular body of the impeller device a percussion pin is accommodated in a freely slidable manner, pressed by a spring supported on a disk fixed in the end of the body, and secured to the support for closing the conduit of the body.

The end of the percussion axis remains facing a firing needle, mounted in the bottom of the explosion chamber, and is actuated by a trip gear arranged at an intermediate point of the percussion needle and through a longitudinal slot thereof and a longer transversal slot made in the wall of the tubular body. The trip gear comprises a trigger hinged to a wall of the slot in the body and which has at one end a point located against the surface of an annular recess of the inner surface of a jacket. The trigger is mounted freely and slidably on the tubular body and urged by a spring supported in a washer fixed at the end of tubular body. The spring is secured to the support end and on an annular seat in the jacket which in turn rests against a stop of the tubular body.

The recess of the jacket where the trip gear ends extends longitudinally, exhibits at an intermediate point an annular tooth capable in response to displacement of the jacket of articulating said trip gear on the tubular body fixed to the support and consequently of displacing the percussion axis.

The latter is automatically released when the annular tooth of the jacket surpasses the trip gear end, effecting in this manner the release of the trip gear and the percussion axis which, urged by the spring, impacts on the firing needle producing the cartridge explosion.

Finally, the support of the impelling device conprises a tube of a predetermined length in order to provide a support for the rod on the ground. This support enables the cartridge explosion reactions to be transmitted to the ground and, in turn establishes a shooting angle for a predetermined maximum throw.

In an embodiment, to carry out the shooting, the operator's hand should grasp the shooting collar, which comprises a tube surrounding the tubular body and presses against the action of a spring, and should rotate it clockwise. When this is done, an integral pin in said collar, will have passed a first tract of a labyrinth cut in the tubular body. Once this is accomplished, the mechanism will be in the condition of starting a longitudinal rearward slide.

In this case the abovementioned pin will slide on the second tract of the labyrinth and will contact the percussion mass, which will be dragged inside the hole and consequently will compress the longitudinal spring to go beyond a certain displacement value. The mass will free itself from the pin action, and the compressed spring will transfer its energy taking the mass to hit the firing needle, provoking the detonation.

Finally, the device is provided with a belt of adjustable length, whose object is that, when the fisherman hangs the launcher from his body, the force produced by the recoil, will be absorbed by the belt.

Therefore, the present invention is referred to an apparatus for impulsing and launching a fishing line.

In order to deploy the device, the following actions will be taken:

With the help of a rod holder, the fishing rod is oriented towards the place selected for the fall of the tackle. Then, the end of the sinker with its line, is taken and displaced aside for a few meters, in such a manner that, when aiming the launcher, the fishing rod will preferably be at the fisherman's right side.

According to the present invention there is provided an apparatus for launching a line. Embodiments of the present invention are described in the remaining appended claims.

Therefore, the present invention refers to an apparatus for impulsing and launching a fishing line holder applicable to a fishing rod, of the type comprising a reel or line carrier of a line or casting line extending among line guides thereof characterized by comprising, in combination, a fishing line holder (with fishhooks and baits) and an impellet device thereof, said device being constituted by a tubular body having its free end portion, an explosion chamber for accommodating a cartridge, closed by a cap or cover provided with a hole for introducing a stem which rests and becomes centered on said cartridge the stem forming an integral part of the line holder, in the bottom of said chamber being mounted a percussion device, coaxially arranged in relation with a percussion axle, mounted in a freely slidable manner in the guiding conduit thereof in the tubular body, coaxial to said chamber, said percussion axle being supported on the end of a first spring, the opposite end of which is resting against a closing disk of the conduit, the free end of said percussion axle having practiced in them respective longitudinal slots through which a trip gear is projected transversally to the body and to said axle, resting on the latter and constituted by an articulated arm to the body slot and exhibiting a tail or free end accommodated in a longitudinal recess made in the inner surface of a jacket, which is mounted freely on the body, said recess of the jacket being provided, in an intermediate point with a drag tooth of the trip gear in contrast to a first spring, the same being capable of locking and unlocking automatically, said line holder being constituted by a vessel, secured to said stem end, inside which is housed a line, which is tied to the bottom and to a closing cap or cover of the vessel, mounted with a free play and capable of detachment in response to its impact against the water.

In order that the present invention is clearly understood and carried into practice easily, by way of example only the preferred embodiments are shown, in the accompanying drawings, of which:

FIG. 3 shows schematically a longitudinal cross section of an embodiment of the impeller device in the position prior to charging of the percussion spring;

FIG. 4 shows schematically a cross section of the jacket of the embodiment before actuating the loaded percussion axle prior to it being released to impact on the blasting cap;

FIG. 5 shows schematically the jacket of the embodiment retracted and the percussion axle against the firing needle;

FIG. 6 shows a schematic longitudinal cross section of another embodiment of the device; and FIG. 7 is a schematic partial view of the second embodiment of the device.

In all figures same reference numbers show equal or corresponding parts.

Figure 1:
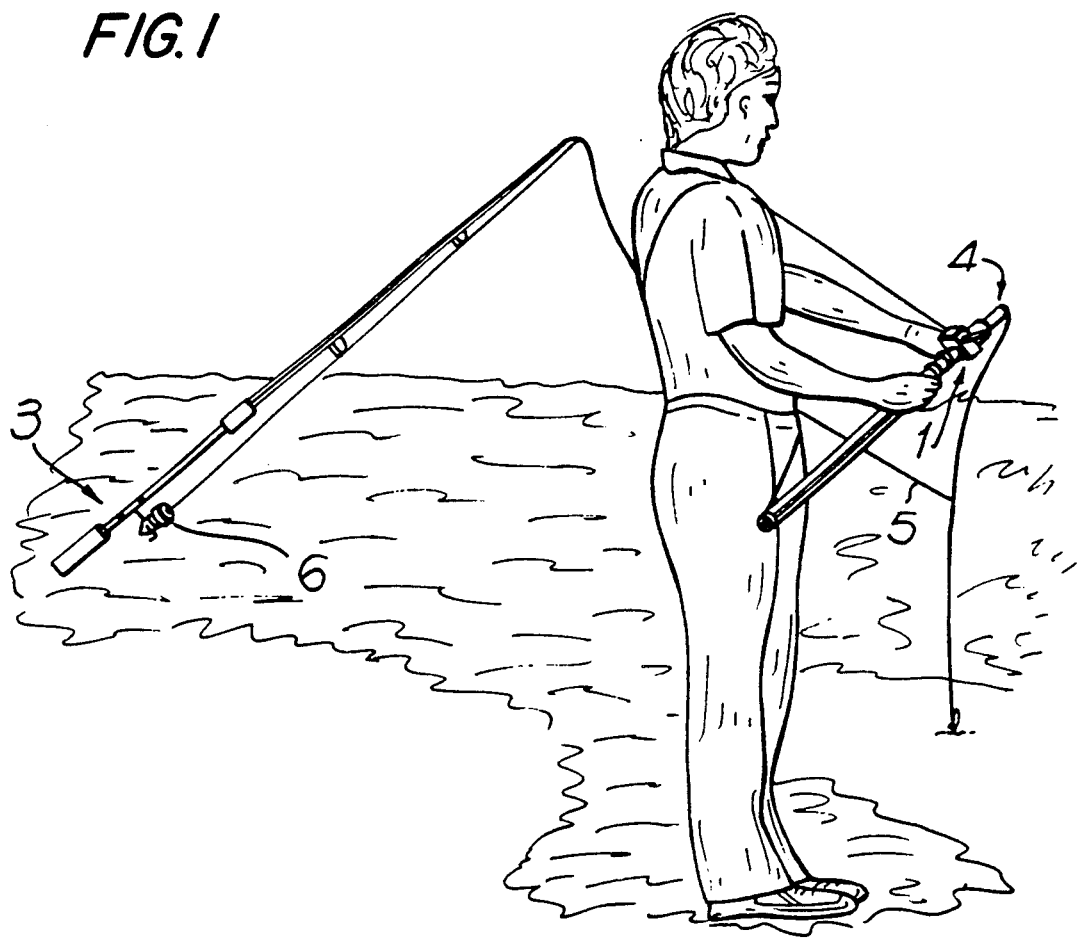
FIGS. 1 and 2 show schematic diagrams of the manners of employing embodiments of the present invention.
Figure 2:
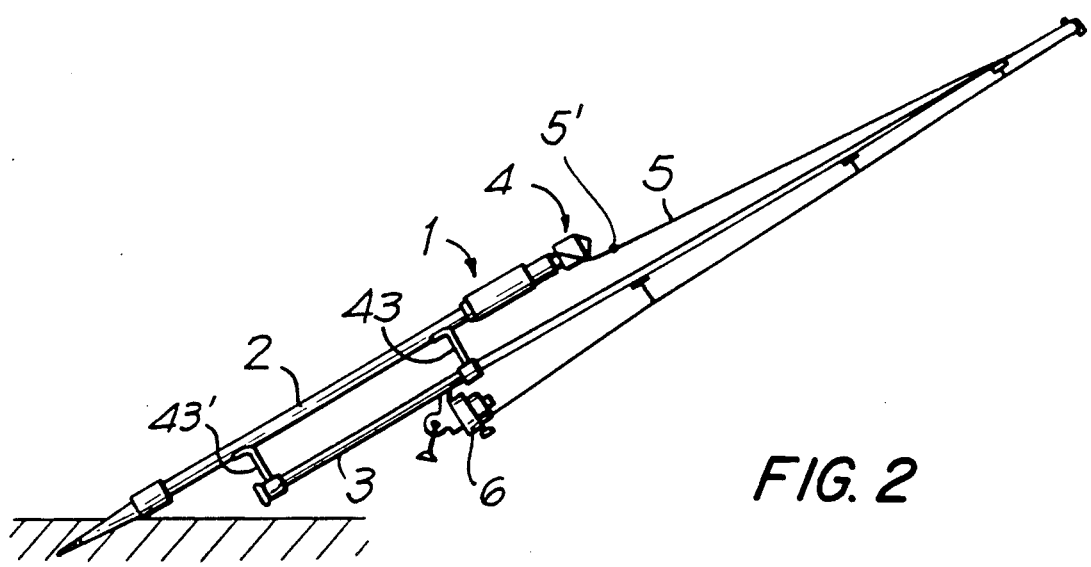

As shown in the drawings, an embodiment of the present invention comprises an impeller device (1), a fixing support of said device (2), a rod (3) and a line holder (4) which is tied by a loop (5') to the end of a casting line (5). The casting line (5) being wound on a reel (6).

The device (1) illustrated in a longitudinal section in FIG. 3, together with the line holder (4) comprises a tubular body (7) defining a conduit (7') having at one end a portion of smaller diameter (8) externally threaded for coupling to a tube (2') of the support (2).

The tubular body (7) has at the other end of the conduit (7'), a chamber or seating (9) for an extractable jacket (10), which extends beyond the free end of the tubular body (7).

Also at its other end, there is a threaded portion (11) for fixating a closure cap (12) of the seating (9) of the jacket (10) and which has a hole (13) coaxial to the conduit (7') of the tubular body (7). In the bottom of the seating (9) of the jacket (10) is located a collar (15) in the inside of which is mounted a firing needle (14) urged by a spring (16). The firing needle (14) is normally retracted by said spring (16) and a part thereof extends inside the conduit (7'). There is also located inside the conduit (7') a percussion axle (18) which has an end (18') in a position facing to and spaced from the firing needle (14), and the other end (19) is slightly enlarged and is supported on a spring (20) which in turn is supported against a disk (21) for closing the conduit (7').

The percussion axle (18) has a longitudinal slot (22) and there is a through slot (23) in the wall of the tubular body (7) in correspondence with said slot (22).

Through these slots (22) and (23), transversally to the tubular body (7) and the percussion axle (18), there is an extended shooting collar (24). The collar (24) is articulated at an extremity on an axle (25) mounted between the facing walls of the slot (23) of the tubular body (7).

The shooting collar (24) has a sharp end (24') which is located inside an annular recess (26) extending longitudinally on the inner surface of a jacket (27). The jacket (27) is mounted in a freely slidable way on the body (7) and against a spring (28) resting on a stop ring (29) fixed to said tubular body (7) and against an annular seating (30) formed in the inner surface of the jacket (27) which has a limiting stop (31) related with an annular boss (32) of the tubular body (7).

The annular recess (26) comprises at an intermediate point an annular tooth (33) which forms, as will be seen below, an actuating organ of the shooting collar (24).

In the inside of the chamber (9) there is mounted a cartridge (35) with a blasting or percussion cap (36) and the base of which is retained by the jacket (10). The cartridge (35) is supported by the end of a stem (36') which is an integrating part of the line holder (4). The stem (36') is fixedly secured to the bottom or base (37) or a pocket (38), wherein a line (39) is housed, with fishhooks and baits, duly folded.

The pocket (38) is closed by a cap (40) and the line (39) is fastened at an end to the cap (40) by means of a peg (41) and at the bottom (37) by means of another peg (41').

The bottom (37) has an orifice (42) for the passage of a loop (5') of the casting line (5), and in turn the cap (40) is mounted in a relatively loose manner, in relation to the vessel (38).

The stem (36'), the caps (37) and (40) are of such a weight which is adequate to accomplish the purpose of a sinker, in order to maintain the line (30) in a desired depth.

The impeller device (1), as previously mentioned becomes fixed by a threaded portion (8) to the support end (2) which comprises a pair of arms (43), (43') where the rod (3) is placed. The tubular support (2) allows location of the device (1) and the line holder (4) in accordance with a shooting angle of a maximum reach, as well as providing support for the rod, and transmits the cartridge explosion reaction to the ground.

The operation of the apparatus is simple and is made in the following manner:

The line (39) is folded in a proper manner by previously placing the baits and introducing the line inside the pocket (38) of the line holder (4), closing the pocket (38) by means of the cap (40), which is simply fitted with any type of adjustment which might prevent its detachment.

Once this operation is effected, the cap (12) is released from the tubular body (7). The jacket (10) is removed to introduce the cartridge (35) and the jacket (10) is then replaced. The cap (12) is then adjusted and the stem (36') is introduced until it abuts on the cartridge (35). The end of the jacket (10) retains the cartridge (35) base against the collar (15) and the firing needle (14) remains confronting the percussion cap (36). Once this operation is effected and the support (2) is placed with the rod (3) in the angular position required, the jacket (27) is slowly moved in against the spring (28), in such a manner that the slot (26) also moves, without modifying the trigger (24) in position.

In accordance to what is shown in FIGS. 4 and 5, the tooth (33) abuts against the end (24') of the shooting collar (24), displacing same angularly around its axle

(25) and simultaneously drags the percussion axle (19) against the spring (20).

The tooth (33) surpasses the end (24') of the shooting collar (24), allowing same to have a free play in the recess (26) of the jacket (27) and therefore the percussion axle (19) is released of the shooting collar (24) pressure impacting on the firing needle (14) and producing the explosion of the cartridge (35).

This generates an impulsive energy which displaces the line holder (4).

The line holder (4) when impacting on the water, release the cap (40) which sinks and drags down the line (39).

The launching device, in another embodiment is illustrated in a longitudinal section in FIG. 6 and comprises a tubular body 101 which functions as a main support of the elements which are described below.

In the forward end, a stepped orifice has been made, wherein a percussion block 121 is accommodated, the same being formed by a cylindrical body, with sliding needle 122 on the inside.

Blocking this and comprising a sealed unit, a bushing 125 is housed, serving as a guide to the needle 122.

To prevent the explosive wave propagation in the case of breakage of the percussion cap of the cartridge, the bushing 125 has two rubber sealing rings 123 and 124.

Before the percussion block 121, a high tenacity steel jacket 126 functions as a housing of an impelling cartridge 130.

This cartridge 130 comprises:
a) a rear body 131 wherein the percussion cap 132 is housed; and
b) a forward body 133 in the form or a suction cup which has a metallic disc 134 in its forward face.

The volume formed by assembling bodies 131 and 133, contains a very small charge of gun powder of the type used in sports.

A jacket 126 is fixed by a threaded cap 127 which attaches it firmly to the body 101. On the longitudinal axis of the body 101, at the rear end, an oblique running hole is round. Inside it slides a conical-cylindrical body, which is termed a "percussion mass" 106.

This mass 106, in its resting position, is in contact with the tail of the percussion needle 122 and the other end rests on the plane of a thrust plate 107 which in turn is pressed by the action of a spring 108. The tubular body 101, has an inner threading, where the end of a rear handle 111 is screwed.

A metallic tube 112 covers and slides on the tubular body 101. Inside it, a ring 104 is accommodated, which is solidly tied thereto by means of a threaded pin 103.

This ring 104, has on one of its faces, a circular orifice, wherein the tail of a spring 105 is introduced. The spring 105, in turn, in the other end has a second tail which is hooked in a hole belonging to the threaded bushing 110 which is fixed to the handle 111.

As may be appreciated in FIG. 6, the pin 103 has the function of pushing rearwardly the mass 106, provided that it previously runs through the labyrinth shown in FIG. 7. To obtain this, the operator should turn the collar 112 clockwise and so the pin could make the path E-B. Then the operator must slide the collar 112 in a longitudinal direction rearwardly; in other words, the pin would have followed the path B-C. This path is where the mass 106 is displaced and the spring 108 is compressed until it surpasses a certain run, the mass 106 goes out of its contact with the pin 103 and becomes projected forwardly, striking the percussion needle 122.

The impact made by the needle 122 on the percussion cap 127 starts the gun powder combustion, which rapidly generates a very high pressure inside the combustion chamber. As a consequence of this, the vacuum cup 133 and its disk 134 in contact with a sinker tail (not shown) projects the same violently forward. At the other end, the disk 134 and the vacuum cup 133 are restrained by the cap 127 and prevent exhaustion of combustion gases. This avoids important noise manifestation.

The diameter of the cap 127, which extends the combustion chamber, has an adjusted size, to allow the controlled exhausting of the burnt gases, producing a low-level blowing noise.

The foregoing description has been given by way of example only and it will be appreciated that modifications may be made without departing from the scope of the present invention.

I claim:

1. An apparatus for launching a fishing line, applicable to a fishing rod, of the type comprising a reel or winding member of a line or casting line extending among line guides thereof, comprising, in combination, a fishing line holder with fishhooks and baits and an impeller device thereof, said device including a tubular body possessing a free end portion having an explosion chamber for accomodating a cartridge closed by a cap provided with a hole for introduction of a stem with support on said cartridge and which forms an integrating part of the line holder, in the bottom of said chamber being mounted a percussion device, coaxially arranged in relation to a percussion axle, mounted in a freely slidable manner on a guiding conduit for percussion with support on an end of a first spring the opposite end of which is found supported against a disk for closure of the conduit, a free end of said percussion axle being facing and spaced from said percussion device, said body and the percussion axle having respective longitudinal slots through which, transversally to the body and to said axle, a shooting collar is projected with support on the axle and constituted by an arm articulated to the body slot and having a tail or free end housed in a longitudinal recess in the inner surface of a jacket, which is mounted in a freely slidable manner on said body, in opposition to a second spring supported against a fixed stop at the rear end of the body, said jacket recess being provided, in an intermediate point, with a drag tooth of the shooting collar and of the percussion axle in opposition to said first spring, the drag tooth and shooting collar being capable of automatically locking and unlocking said axle for its impact against the percussion device, said line holder being, in turn, constituted by a vessel, secured to an end of said stem, inside which said fishing line is accommodated, which is tied to the bottom of a closing cap of the vessel, mounted with free play and capable of being removed in response to its impact against the water.

2. An apparatus according to claim 1, wherein the percussion axle comprises a slot the rear end of which forms a support of the shooting collar, said axle having an end portion of a larger diameter providing a support for the second spring and a stop for said axle against an annular seat of the tubular body.

3. An apparatus according to claim 1, wherein said shooting collar is articulated on a transversal axle of the tubular body slot and located transversally to said slot.

4. An apparatus according to claim 1, and further comprising a tube having a threaded end portion for attachment of the impeller device of the fishing line, and an opposite end portion for driving same into the ground, said tube being provided with a pair of holding arms.

5. An apparatus according to claim 1, wherein a body of a firing needle comprises a guiding collar of the firing needle, properly, which extends coaxially with said chamber and is urged by a spring to a retracted position, said firing needle facing the end of the percussion axle by its end opposite to the percussion cap of said cartridge accommodated inside said jacket and in support against the stem of the line holder.

6. An apparatus according to claim 5 wherein said line holder comprises in its bottom a transversal passage for a tie loop with the casting line, said fishing line becoming tied to the bottom and the cap by means of respective rings.

7. An apparatus according to claim 6, wherein the bottom and the cap of the line holder vessel include respective parts of high specific weight to form the sinker.

8. An apparatus for launching a fishing line comprises, in combination a running tackle line system and an impeller device including a tubular body having a free end portion, an accommodating enclosure of a cylindrical tube which constitutes an explosion chamber wherein an impeller cartridge is accommodated, a fixation threaded cap of this cylindrical tube attaches to the tubular body having an inlet orifice for the sinker stem which is supported on an end of said cartridge, a percussion device mounted in the bottom of said explosion chamber, coaxially arranged in relation to a percussion axle which freely slides in a percussion guiding conduit resting on a sliding percussion mass in the inside of a cylindrical cavity arranged obliquely with respect to its longitudinal axis in said tubular body, a spring arranged against said percussion mass, a collar in the form of a tube and enveloping the tubular body, said collar providing inside it and integrally a pin pushing the percussion mass and compressing the spring which is in contact thereof, a laberynthic slot cut in the tubular body accommodating an end of said pin.

9. An apparatus according to claim 8, wherein said impeller cartridge is composed by two parts assembled under pressure, wherein a charge is enclosed, which in its rear portion has accommodated a percussion cap and in the forward sector has a metallic disk adhered, in such a manner that this subassembly has the function of a plunger within the jacket, pushing the sinker stem outside, during the explosion of the charge.

10. An apparatus according to claim 8, wherein the sinker stem of the fishing line, is introduced into the mouth of the launcher and in contact with a metallic zone of the cartridge, and is expelled when the cartridge is detonated.

11. An apparatus according to claim 8 wherein said tubular body has at an end a first threaded portion for attachment of said cap of a cartridge holding jacket.

12. An apparatus according to claim 8, wherein said chamber of the tubular body comprises a jacket projecting beyond the free end of the body, and, as it is retained by said threaded cap, forms a retention means for the cartridge, inside the housing of the jacket.

13. An apparatus according to claim 8 wherein the percussion device includes a guiding collar and a percussion needle, accommodated inside the tubular body, coaxially with the jacket in such a manner that one of the ends faces the percussion mass, and the other end faces, the percussion cap of the cartridge housed in the jacket.

14. An apparatus according to claim 8, wherein the percussion axle comprises a hole obliquely made in which said percussion mass slides in such a manner that one of its ends is pressed by said spring and the other of its ends is in contact with a percussion needle.

* * * * *